(12) United States Patent
Culver

(10) Patent No.: US 9,774,198 B2
(45) Date of Patent: Sep. 26, 2017

(54) WIND AND SOLAR POWERED HEAT TRACE WITH HOMEOSTATIC CONTROL

(76) Inventor: Brandon Culver, Elk City, OK (US)

( * ) Notice: Subject to any disclaimer, the term of this patent is extended or adjusted under 35 U.S.C. 154(b) by 1199 days.

(21) Appl. No.: 12/927,101

(22) Filed: Nov. 8, 2010

(65) Prior Publication Data

US 2012/0112546 A1 May 10, 2012

(51) Int. Cl.
| | |
|---|---|
| *H02J 9/00* | (2006.01) |
| *H02J 7/00* | (2006.01) |
| *H02J 7/34* | (2006.01) |
| *H02J 7/35* | (2006.01) |
| *H02J 9/06* | (2006.01) |

(52) U.S. Cl.
CPC .......... *H02J 7/0029* (2013.01); *H02J 7/0047* (2013.01); *H02J 7/34* (2013.01); *H02J 7/35* (2013.01); *H02J 9/06* (2013.01); *H02J 2007/0037* (2013.01); *H02J 2007/0049* (2013.01); *Y02B 10/72* (2013.01); *Y10T 307/625* (2015.04)

(58) Field of Classification Search
CPC .......... H02J 7/0029; H02J 7/0047; H02J 7/34; H02J 7/35; H02J 9/06; H02J 2007/0037; H02J 2007/0049; Y10T 307/625; Y02B 10/72
USPC ......... 219/201; 320/138; 307/18, 19, 23, 65, 307/66; 136/244, 251, 248, 291; 290/55, 290/44; 60/641.8, 398; 310/303, 10; 416/3, 23, 5
See application file for complete search history.

(56) References Cited

U.S. PATENT DOCUMENTS

| | | | | |
|---|---|---|---|---|
| 2,696,566 | A | * | 12/1954 | Lion et al. ...................... 307/52 |
| 3,132,292 | A | * | 5/1964 | Baur ............................. 318/632 |
| 3,292,687 | A | * | 12/1966 | Evans ........................... 165/255 |
| 4,158,356 | A | * | 6/1979 | Wininger ...................... 126/579 |
| 4,182,960 | A | * | 1/1980 | Reuyl ........................... 290/1 R |
| 4,206,396 | A | * | 6/1980 | Marks ........................... 322/2 A |
| 4,224,082 | A | * | 9/1980 | Jacobson ...................... 136/248 |
| 4,355,195 | A | * | 10/1982 | Sansbury ...................... 136/254 |
| 4,358,929 | A | * | 11/1982 | Molivadas ................... 60/641.8 |
| 4,367,403 | A | * | 1/1983 | Miller ......................... 250/203.4 |
| 4,369,629 | A | * | 1/1983 | Lockwood ..................... 60/698 |
| 4,441,872 | A | * | 4/1984 | Seale ............................ 417/282 |
| 4,551,631 | A | * | 11/1985 | Trigilio ......................... 290/55 |
| 4,651,017 | A | * | 3/1987 | Longrigg ....................... 290/44 |
| 4,731,547 | A | * | 3/1988 | Alenduff et al. ............... 307/85 |

(Continued)

FOREIGN PATENT DOCUMENTS

| | | |
|---|---|---|
| CA | 2497375 A1 | 2/2005 |
| CN | 2004103207 A | 4/2004 |

(Continued)

*Primary Examiner* — Eric Stapleton
(74) *Attorney, Agent, or Firm* — Charles Walter

(57) ABSTRACT

A homeostatic heat trace powered by wind and solar electrical generators for preventing freeze-up of equipment at remote sites. A heat trace system wherein solar power may be used as backup when wind velocities are too low or high. A heat trace with a UPS backup for preventing freeze-up of equipment at remote sites during power failure. A homeostatic control system for maximizing the utilization of energy stored in a bank of batteries. A programmable logic controller with a homeostatic control system for maintaining battery charge. A homeostatic heat trace system powered by wind and backed up by solar power to prevent freeze-up of equipment at remote sites, including oil and gas wells.

17 Claims, 14 Drawing Sheets

(56) References Cited

U.S. PATENT DOCUMENTS

| | | | | |
|---|---|---|---|---|
| 5,075,564 A * | 12/1991 | Hickey | | 290/55 |
| 5,225,712 A * | 7/1993 | Erdman | | 290/44 |
| 5,228,924 A * | 7/1993 | Barker et al. | | 136/246 |
| 5,254,876 A * | 10/1993 | Hickey | | 290/55 |
| 5,293,892 A * | 3/1994 | Fourqurean | | 137/3 |
| 5,334,877 A * | 8/1994 | Mohan et al. | | 307/46 |
| 5,560,700 A * | 10/1996 | Levens | | 362/558 |
| 5,686,766 A * | 11/1997 | Tamechika | | 307/64 |
| 5,856,712 A * | 1/1999 | Suzuki et al. | | 307/64 |
| 5,982,253 A * | 11/1999 | Perrin et al. | | 333/182 |
| 6,032,732 A * | 3/2000 | Yewell | | 166/57 |
| 6,037,749 A * | 3/2000 | Parsonage | | 320/132 |
| 6,060,658 A * | 5/2000 | Yoshida et al. | | 136/243 |
| 6,067,243 A * | 5/2000 | Suzuki et al. | | 363/132 |
| 6,080,927 A * | 6/2000 | Johnson | | 136/248 |
| 6,109,029 A * | 8/2000 | Vowles et al. | | 60/398 |
| 6,184,593 B1 * | 2/2001 | Jungreis | | 307/64 |
| 6,201,371 B1 * | 3/2001 | Kawabe et al. | | 320/121 |
| 6,288,916 B1 * | 9/2001 | Liu et al. | | 363/37 |
| 6,296,007 B1 * | 10/2001 | Cifune | | 137/15.25 |
| 6,338,381 B1 * | 1/2002 | McClung, III | | 165/45 |
| 6,428,694 B1 * | 8/2002 | Brown | | 210/170.07 |
| 6,455,954 B1 * | 9/2002 | Dailey | | 307/66 |
| 6,512,966 B2 * | 1/2003 | Lof et al. | | 700/291 |
| 6,542,791 B1 * | 4/2003 | Perez | | 700/295 |
| 6,602,627 B2 * | 8/2003 | Liu et al. | | 429/416 |
| 6,608,404 B2 * | 8/2003 | Schienbein et al. | | 307/82 |
| 6,616,402 B2 * | 9/2003 | Selsam | | 415/3.1 |
| 6,639,328 B2 * | 10/2003 | Wacknov | | 290/52 |
| 6,688,303 B2 * | 2/2004 | Davenport et al. | | 126/570 |
| 6,776,227 B2 * | 8/2004 | Beida et al. | | 166/61 |
| 6,803,515 B2 * | 10/2004 | Itoyama et al. | | 136/251 |
| 6,841,971 B1 * | 1/2005 | Spee et al. | | 320/119 |
| 6,897,370 B2 * | 5/2005 | Kondo et al. | | 136/243 |
| 7,008,171 B1 * | 3/2006 | Whitworth | | 415/4.2 |
| 7,045,702 B2 * | 5/2006 | Kashyap | | 136/244 |
| 7,050,312 B2 * | 5/2006 | Tracy et al. | | 363/37 |
| 7,151,326 B2 * | 12/2006 | Jordan | | 307/22 |
| 7,230,213 B2 * | 6/2007 | Naylor | | 219/528 |
| 7,309,831 B2 * | 12/2007 | Yamada et al. | | 136/251 |
| 7,345,374 B1 * | 3/2008 | Jones et al. | | 290/44 |
| 7,385,304 B1 * | 6/2008 | Wohlert | | 290/55 |
| 7,449,798 B2 * | 11/2008 | Suzuki et al. | | 307/65 |
| 7,453,167 B2 * | 11/2008 | Gilbert | | 290/55 |
| 7,465,873 B2 * | 12/2008 | Nomura et al. | | 136/244 |
| 7,476,987 B2 * | 1/2009 | Chang | | 290/55 |
| 7,523,001 B2 * | 4/2009 | Morjaria et al. | | 702/3 |
| D595,885 S * | 7/2009 | Daidone et al. | | D26/69 |
| 7,615,891 B2 * | 11/2009 | Wu et al. | | 307/66 |
| 7,701,083 B2 * | 4/2010 | Savage | | 307/29 |
| 7,750,503 B2 * | 7/2010 | Kotani et al. | | 307/66 |
| 7,759,812 B2 * | 7/2010 | Taylor et al. | | 290/44 |
| 7,768,153 B2 * | 8/2010 | Wang | | 307/66 |
| 7,780,852 B2 * | 8/2010 | DeVoe | | 210/649 |
| 7,802,426 B2 * | 9/2010 | Bollinger | | 60/508 |
| RE41,965 E * | 11/2010 | West | | 307/64 |
| 7,885,917 B2 * | 2/2011 | Kuhns et al. | | 706/48 |
| 7,954,321 B2 * | 6/2011 | Shinnar | | 60/641.8 |
| 8,097,926 B2 * | 1/2012 | De Graff et al. | | 257/419 |
| 8,103,389 B2 * | 1/2012 | Golden et al. | | 700/295 |
| 8,174,136 B2 * | 5/2012 | Johnson et al. | | 290/44 |
| 8,299,645 B2 * | 10/2012 | Muchow et al. | | 290/55 |
| 8,396,821 B2 * | 3/2013 | Kuhns et al. | | 706/48 |
| 8,420,926 B1 * | 4/2013 | Reedy et al. | | 136/248 |
| 8,421,257 B2 * | 4/2013 | Chernyshov | | 290/44 |
| 8,421,263 B2 * | 4/2013 | Wilson et al. | | 290/55 |
| 2001/0004170 A1 * | 6/2001 | Schienbein et al. | | 307/18 |
| 2001/0013703 A1 * | 8/2001 | Croes | | 290/55 |
| 2002/0066269 A1 * | 6/2002 | Denniss | | 60/398 |
| 2002/0084655 A1 * | 7/2002 | Lof et al. | | 290/44 |
| 2002/0195138 A1 * | 12/2002 | Itoyama et al. | | 136/251 |
| 2003/0006613 A1 * | 1/2003 | Lof et al. | | 290/44 |
| 2003/0047209 A1 * | 3/2003 | Yanai et al. | | 136/291 |
| 2003/0076005 A1 * | 4/2003 | Moreland et al. | | 310/301 |
| 2003/0116154 A1 * | 6/2003 | Butler et al. | | 126/569 |
| 2003/0117822 A1 * | 6/2003 | Stamenic et al. | | 363/132 |
| 2003/0121514 A1 * | 7/2003 | Davenport et al. | | 126/570 |
| 2003/0160454 A1 * | 8/2003 | Manolis et al. | | 290/1 R |
| 2003/0167105 A1 * | 9/2003 | Colborn | | 700/295 |
| 2003/0230333 A1 * | 12/2003 | Kashyap | | 136/243 |
| 2004/0044442 A1 * | 3/2004 | Bayoumi et al. | | 700/286 |
| 2004/0066094 A1 * | 4/2004 | Suzuki et al. | | 307/18 |
| 2005/0063865 A1 * | 3/2005 | Bonne et al. | | 422/68.1 |
| 2005/0127680 A1 * | 6/2005 | Lof et al. | | 290/44 |
| 2006/0087800 A1 * | 4/2006 | Savage | | 361/601 |
| 2006/0191902 A1 * | 8/2006 | Naylor | | 219/528 |
| 2006/0207646 A1 * | 9/2006 | Terreau et al. | | 136/251 |
| 2006/0260672 A1 * | 11/2006 | Niederer | | 136/251 |
| 2007/0001460 A1 * | 1/2007 | Killian | | 290/44 |
| 2007/0040387 A1 * | 2/2007 | Roseman | | 290/44 |
| 2007/0100506 A1 * | 5/2007 | Teichmann | | 700/297 |
| 2007/0164567 A1 * | 7/2007 | Luetze et al. | | 290/44 |
| 2007/0164571 A1 * | 7/2007 | Hsiung et al. | | 290/55 |
| 2007/0170724 A1 * | 7/2007 | Calley | | 290/44 |
| 2007/0173982 A1 * | 7/2007 | Cardinal et al. | | 700/286 |
| 2007/0182161 A1 * | 8/2007 | Mann | | 290/55 |
| 2007/0182162 A1 * | 8/2007 | McClintic | | 290/55 |
| 2007/0194575 A1 * | 8/2007 | Wu | | 290/55 |
| 2007/0194759 A1 * | 8/2007 | Shimizu et al. | | 320/166 |
| 2007/0200348 A1 * | 8/2007 | Ichinose et al. | | 290/44 |
| 2007/0235326 A1 * | 10/2007 | Lin | | 204/278 |
| 2007/0246943 A1 * | 10/2007 | Chang et al. | | 290/44 |
| 2007/0267874 A1 * | 11/2007 | Taylor et al. | | 290/55 |
| 2008/0079263 A1 * | 4/2008 | Morjaria et al. | | 290/44 |
| 2008/0150292 A1 * | 6/2008 | Fedor et al. | | 290/55 |
| 2008/0258470 A1 * | 10/2008 | Khoo et al. | | 290/1 A |
| 2008/0285271 A1 * | 11/2008 | Roberge et al. | | 362/235 |
| 2008/0289352 A1 * | 11/2008 | Parent | | 62/291 |
| 2009/0014057 A1 * | 1/2009 | Croft et al. | | 136/248 |
| 2009/0026771 A1 * | 1/2009 | Bevington et al. | | 290/55 |
| 2009/0026879 A1 * | 1/2009 | Prelas | | 310/303 |
| 2009/0028705 A1 * | 1/2009 | Meldgaard et al. | | 416/23 |
| 2009/0028706 A1 * | 1/2009 | Ioana et al. | | 416/41 |
| 2009/0032081 A1 * | 2/2009 | Saita et al. | | 136/244 |
| 2009/0032082 A1 * | 2/2009 | Gilmore et al. | | 136/244 |
| 2009/0032084 A1 * | 2/2009 | Aiken et al. | | 136/246 |
| 2009/0032089 A1 * | 2/2009 | Chen et al. | | 136/251 |
| 2009/0038668 A1 * | 2/2009 | Plaisted | | 136/244 |
| 2009/0085404 A1 * | 4/2009 | Suzuki et al. | | 307/46 |
| 2009/0108782 A1 * | 4/2009 | Klatt | | 318/400.17 |
| 2009/0114264 A1 * | 5/2009 | Giampietro et al. | | 136/244 |
| 2009/0119073 A1 * | 5/2009 | Bourgeois et al. | | 703/1 |
| 2009/0133733 A1 * | 5/2009 | Retti | | 136/206 |
| 2009/0152867 A1 * | 6/2009 | Cripps | | 290/42 |
| 2009/0160187 A1 * | 6/2009 | Scholte-Wassink | | 290/44 |
| 2009/0160254 A1 * | 6/2009 | Wu et al. | | 307/66 |
| 2009/0174259 A1 * | 7/2009 | Lin et al. | | 307/65 |
| 2009/0191057 A1 * | 7/2009 | Knutson | | 416/23 |
| 2009/0200803 A1 * | 8/2009 | Ichinose et al. | | 290/44 |
| 2009/0200804 A1 * | 8/2009 | Nielsen et al. | | 290/44 |
| 2009/0200807 A1 * | 8/2009 | Adams | | 290/54 |
| 2009/0200808 A1 * | 8/2009 | Parmley, Sr. | | 290/55 |
| 2009/0205247 A1 * | 8/2009 | Wobben | | 44/639 |
| 2009/0206603 A1 * | 8/2009 | Llorente Gonzalez | | 290/44 |
| 2009/0206604 A1 * | 8/2009 | Meiners | | 290/44 |
| 2009/0206605 A1 * | 8/2009 | Schmidt | | 290/44 |
| 2009/0206606 A1 * | 8/2009 | Jorgensen et al. | | 290/44 |
| 2009/0206607 A1 * | 8/2009 | Nakamura et al. | | 290/44 |
| 2009/0206610 A1 * | 8/2009 | Martin et al. | | 290/55 |
| 2009/0295162 A1 * | 12/2009 | Oohara et al. | | 290/44 |
| 2009/0307178 A1 * | 12/2009 | Kuhns et al. | | 706/54 |
| 2010/0043435 A1 * | 2/2010 | Hinders et al. | | 60/645 |
| 2010/0045042 A1 * | 2/2010 | Hinders et al. | | 290/52 |
| 2010/0090463 A1 * | 4/2010 | Nies et al. | | 290/44 |
| 2010/0147605 A1 * | 6/2010 | Klatt | | 180/65.1 |
| 2010/0150718 A1 * | 6/2010 | Freda | | 416/120 |
| 2010/0176602 A1 * | 7/2010 | Shinnar | | 290/1 A |
| 2010/0229916 A1 * | 9/2010 | Bechamp | | 136/244 |
| 2011/0277471 A1 * | 11/2011 | Shinnar | | 60/641.14 |

(56) References Cited

U.S. PATENT DOCUMENTS

FOREIGN PATENT DOCUMENTS

| CN | 201083112 Y | 7/2008 |
|----|-------------|--------|
| JP | 2000009879 A | 1/2000 |
| RU | 2350847 C1 | 3/2009 |

* cited by examiner

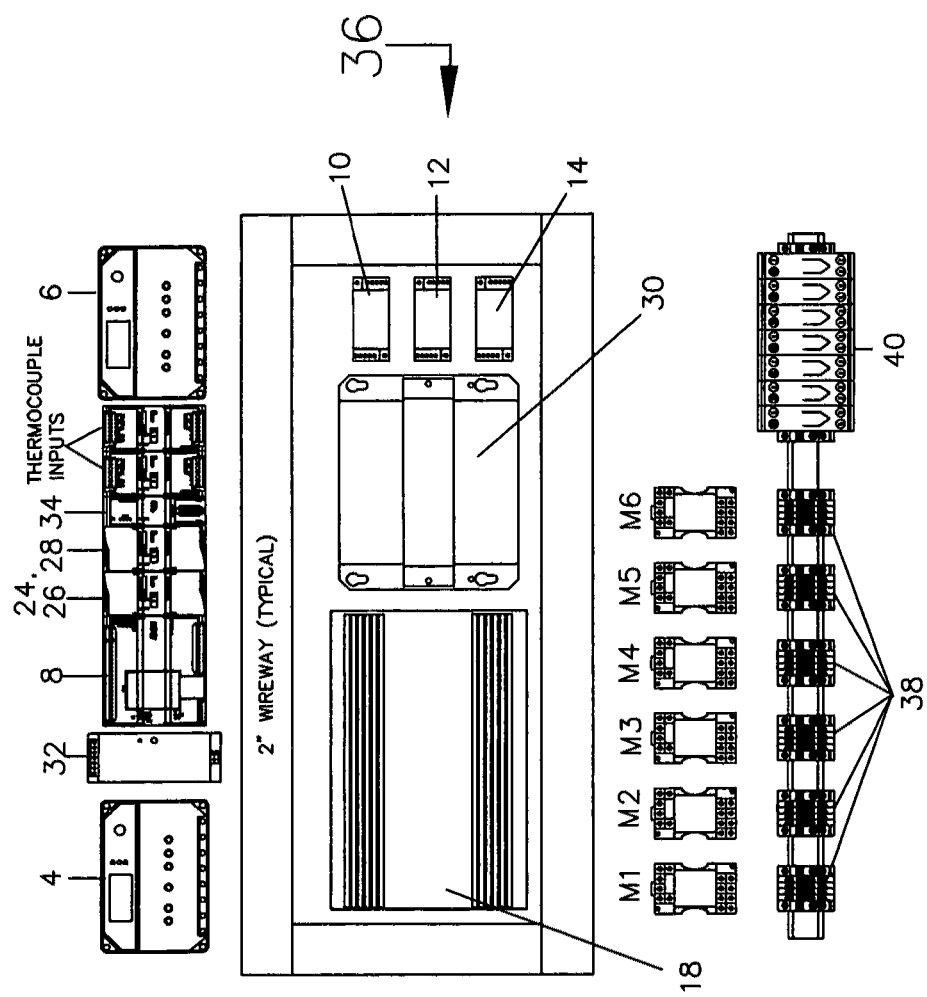

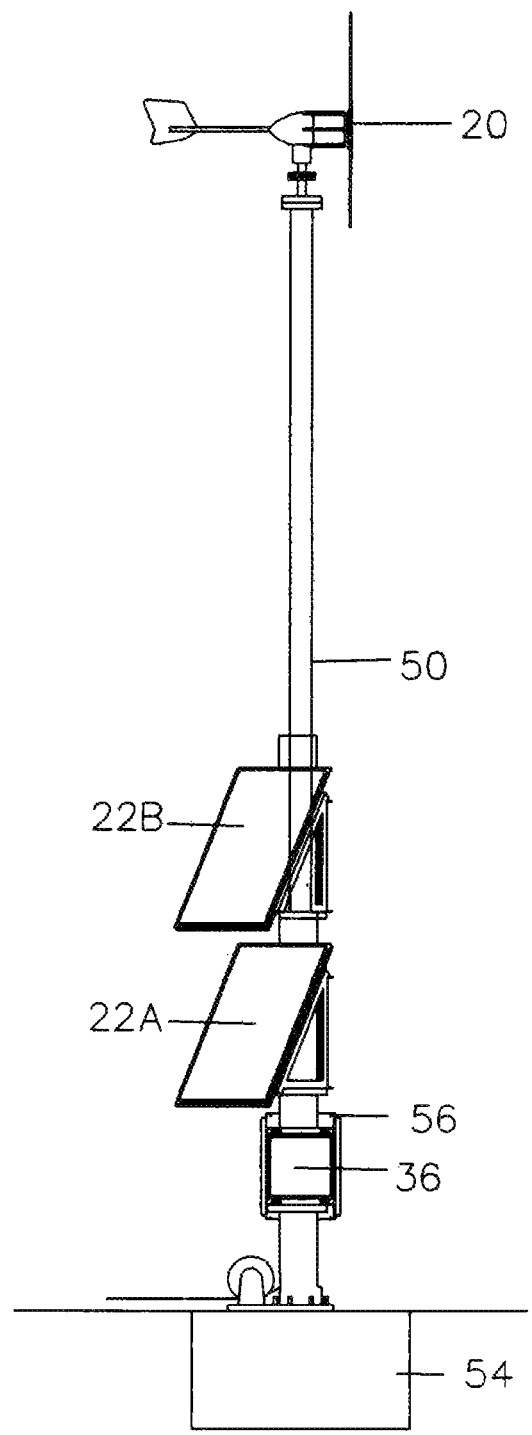

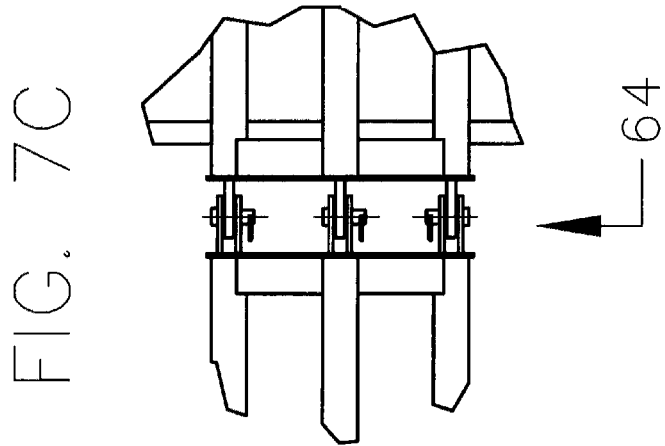

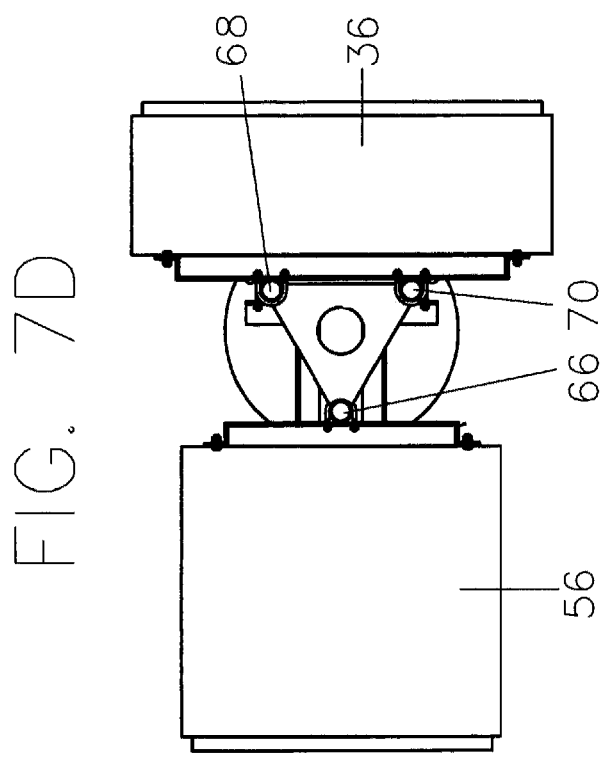

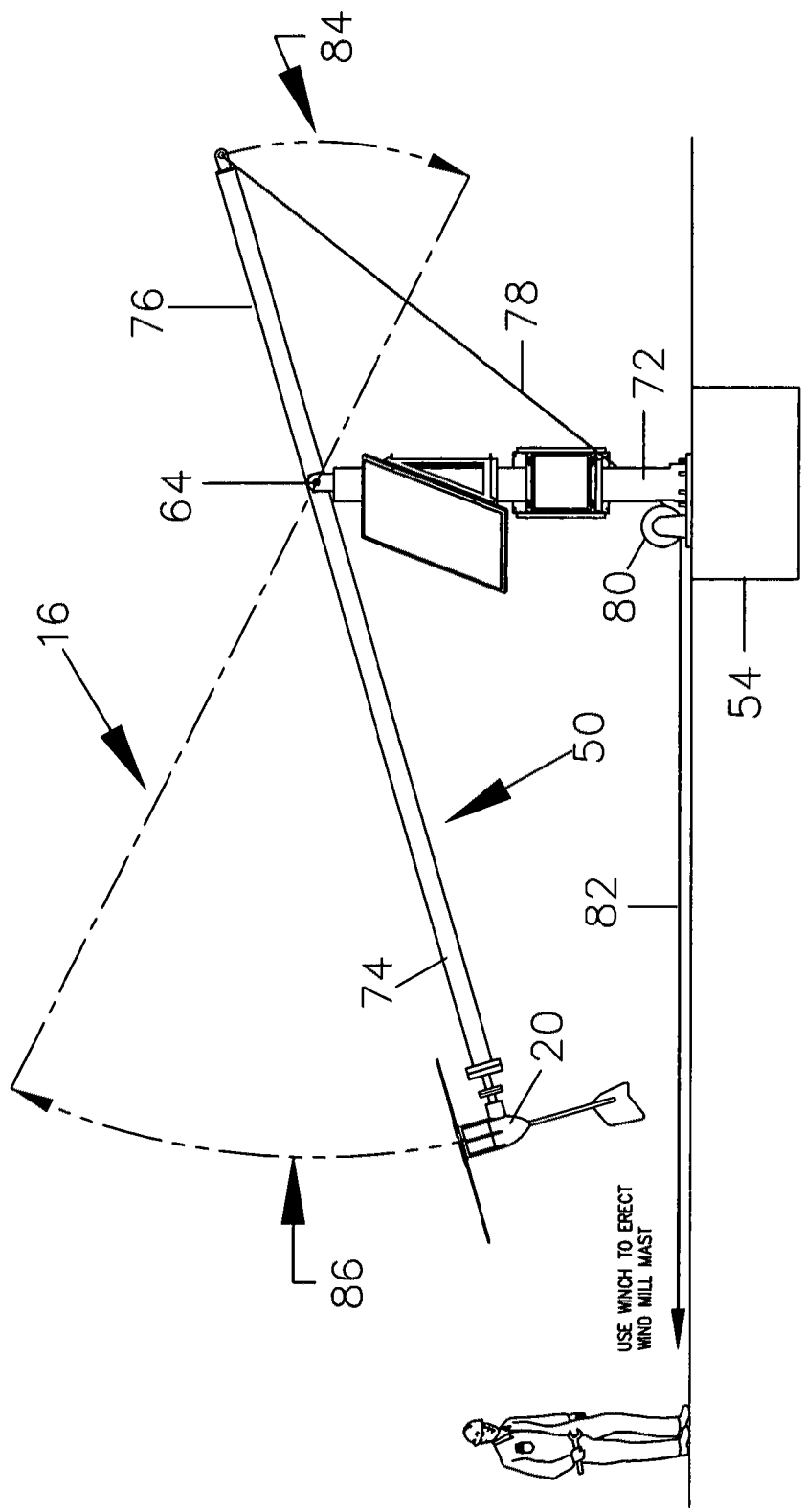

WIND AND SOLAR POWERED HEAT TRACE WITH HOMEOSTATIC CONTROL

BACKGROUND OF THE INVENTION

A heat trace system (HTS) is basically a device that distributes alternating current (AC) electricity to one or more heat trace sections where heating elements maintain or raise the temperature of equipment (e.g. insulated pipes, vessels, etc.).

Heating prevents equipment from freezing by replacing heat lost to the atmosphere. If the heat replaced matches the heat lost due to falling ambient temperatures, the equipment temperature remains constant. An ambient temperature thermocouple sensor together with heat trace thermocouple sensors may be used to control equipment temperature by activating their heat trace sections before the equipment freezes. 40° F. is the usual standard for turning on heat.

Since heat trace systems require alternating current, they are well adapted for use near commercial AC power outlets. However there is also a need for heat trace systems at remote locations where there is no commercial source of AC. The present invention provides a remote HTS powered by renewable sources of AC electrical power that is cost-effective, reliable, environmentally friendly.

Combustion engines generators are well-known in the art, and, while they produce sufficient DC for heat trace systems, they require fueling, constant maintenance, and may be environmentally unacceptable.

Solar panels may also be used to produce DC electricity, but solar panels generate electricity only when they are exposed to sunlight, and the number required to power an effective HTS would be expensive.

Aerogenerators (wind turbines) produce sufficient DC electricity for an effective HTS when wind velocities are within a certain range, but they produce no electricity when the wind velocity is too low or too high.

The present invention provides a reliable, inexpensive, environmentally friendly HTS for use in remote locations by combining the cost-effectiveness of aerogenerators with non-polluting solar power, and controlling the distribution of the energy produced with a novel homeostatic control mechanism.

There is nothing new about combining solar and wind power to generate DC electricity. Hickey, U.S. Pat. No. 5,254,876 discloses a combination solar and wind powered generator with a plurality of light sensitive cells in spiral vanes. Whitworth, U.S. Pat. No. 7,008,171 discloses a plurality of modified Savonius rotors which may be coated with photo voltaic cell material and have a cone-shaped solar collector on top for additional energy production. Kashyap, U.S. Pat. No. 7,045,702 discloses an electrical generator comprising a windmill with aerodynamic blades provided with solar panels. Gilbert, U.S. Pat. No. 7,453,167 disclose a wind turbine with solar panels mounted on the surfaces of the turbine such that the energy output is from both sources. Suzuki et al., U.S. Pat. No. 7,449,798 discloses a co-generated power supply using wind and solar energy integrated with a commercial power source for a voltage and load-leveling constant power device. Semenovitch, RU 2350847 discloses a device that includes a photovoltaic module, a wind power plant and a micro hydro-power plant to enhance the efficiency of an in-well heat supply system.

The present invention is distinct from the prior art in may ways, including that none of these wind/solar devices provide controlled AC input to sections of a multi-sectioned heat trace system, with energy distribution when generation from wind is low.

There is a need for heat trace systems at remote oil and gas well sites and pipelines to protect pipelines and equipment from freezing, to increase or maintain fluid viscosity and flow in pipelines, and/or to enhance production. Yewell, U.S. Pat. No. 6,032,732 re-routes engine coolant from a pumper engine to a heat tracing loop that protects a well head assembly from freezing. McClung, U.S. Pat. No. 6,338,381 disclose a system that transfers heat between an earth conduit or loop and a pipeline, rig or wellhead, thereby heating or cooling the pipeline, rig or wellhead. Beida, U.S. Pat. No. 6,776,227 discloses a method for preventing freezing of wellhead equipment utilizing radiant heat from a flameless heater to heat fluid that is circulated to the equipment. Bourgeois et al., U.S. Pub. No. 2009/0119073 & W.O. Pub. No. 2009/055545 disclose a design and method for finding potential freeze spots in pipe systems. Finally, Hiroyuki, JP 2000,009,879 and Yoshimasa et al., JP 2004, 103,267 provide a control device for a HTS using a commercial utility supply.

Thus, prior art heat trace systems used at remote oil and gas wells are generally powered by a commercial utility source, a combustion engine generator or a heat source that is not electrical. None of these heat trace systems is powered by electricity.

There are a number of reasons why solar electrical generators are not widely used to generate electricity for heat trace systems at remote oil and gas wells. One is because the solar panels needed to power heat traces of a practical size are expensive. Another is because they produce no energy during night, and they can be unreliable in locations where sunlight is inadequate. Yet other reasons are because smaller solar panels have insufficient power for longer heat trace sections. Yet another reason is because solar panel control systems are unable to monitor multiple sections areas for heat tracing, and have no means for maximizing power as required by the actual conditions at the well. For example, the heat trace system disclosed by Squire, CA 2497375 uses a timing relay to maintain a fifty percent (one hour on, one hour off) "duty cycle" to reduce the size of the solar panels. Even so, CA '375's 20 watt/ft heat trace produces only 7 watt/ft of heat that can be run no farther than five feet. Moreover, the HTS in CA '375 lacks a means for maximizing power utilization, nor can it monitor multiple areas for heat tracing.

Likewise, there are a number of reasons why wind-powered electrical generators are not widely used to generate electricity for heat trace systems at remote well sites. One is because they are unreliable without backup at remote locations where wind velocities may be inadequate or too great. Another is because they a lack means of obtaining a constant flow of heat trace track cable and the ability to monitor the area being heat traced or the ability to distribute heat when stored energy is low. For example, in the heat trace system disclosed by Qing-Wu et al., CN 201083112, a hyperbola negative-pressure duplex windmill is connected directly to heating cables via an asynchronous device that converts the mechanical energy into electricity and a transformer that converts three-phase voltage into single-phase. If there is any excess energy, it is stored as heat in oil wells and released later when the wind velocity is low.

There is therefore a need for a simple, cost-effective, and environmentally friendly combined wind and solar-powered generator that reliably generates sufficient energy for heat trace systems used in oil and gas recovery systems and pipelines operating in remote locations without a source of commercial electrical power.

SUMMARY OF THE INVENTION

The present invention provides a homeostatic HTS that includes a plurality of heat trace sections powered by wind and solar electrical generators wherein the solar power may be used to backup the electrical system when wind velocities are too low or high. Energy from the generators is stored in a bank of batteries and then converted into AC power by a DC to AC inverter. The AC power is distributed to the heat trace sections by the invention's novel control system, which is programmed in a programmable logic controller (PLC). The homeostatic variable being regulated is the voltage of the batteries, which is maintained near its maximum charge, the receptors that monitor environmental changes are thermocouple sensors, the stimulus monitored is temperature, the control center is the invention's control system in the PCL, and the effectors receiving information from the PCL are relays which distribute the AC power to the heat trace sections, thereby maximizing the use of stored energy for heating vulnerable components and preventing them from freezing.

The system's novel control system distributes power to heat trace sections requiring power to prevent freezing. When wind power is sufficient, homeostasis is maintained by energy from the aerogenerator. When wind power is restricted (high or low wind velocity) and solar power is sufficient to fully backup the system, homeostasis is maintained by energy from both generators. If wind power is restricted further or solar power is insufficient to fully back up the system, the system may ration energy to heat trace sections as needed to prevent freezing. Thus, when both wind and solar power are restricted and homeostasis cannot be maintained, the PLC alternates power distribution to each heat trace section, thereby maximizing the use of stored energy to prevent freezing. In the event the batteries become depleted, the PLC activates an alert system.

The present invention may be used to prevent freezing of any type of equipment in remote locations, and is particularly adapted to keep vulnerable components and pipes at remote oil and gas wells from freezing. In that setting, the invention systematically allocates heat according to real time needs of vulnerable components of one or more remote oil and gas wells and mitigates nearly all of the problems with remote electrical heat trace systems in a cost-effective and environmentally friendly HTS that can be easily set up at well heads serviced by it.

BRIEF DESCRIPTION OF THE DRAWINGS

FIG. 3 . . . Backpan Layout for HTS.

FIG. 5b . . . Pipe-style HTS with two solar panels.

FIG. 7c . . . Triangle-style hinge for HTS tower.

FIG. 7d . . . Attachment for electrical box and battery bank.

FIG. 8a . . . Hinged HTS in service position.

DETAILED DESCRIPTION OF THE INVENTION

The present invention comprises one or more sources of energy input (E(in)) through a novel homeostatic control system with output (E(out)) to one or more energy-consuming components. In the HTS, E(in) is generated from wind and sunlight by an aerogenerator and at least one solar panel and stored in a bank of deep-cell batteries, and may be consumed by at least one heat trace section used to prevent equipment from freezing. The control system maintains homeostasis when E(in)=E(out), and the batteries in the bank are fully charged.

As in all homeostatic control systems, the control system for the present invention has a variable (V) being controlled, and at least three independent components for regulating it. The receptor, R monitors environmental changes and sends information about the environment to a control center, C. C sets the range homeostasis and sends information to an effector, F. If V moves out of its homeostatic range, F attempts to implement a correction to re-establishing homeostasis.

In the HTS, C is contained in a standard programmable logic controller (PLC) and V is the voltage of one or more deep cell batteries in a battery bank. Homeostasis means that the batteries are fully charged, and the PLC is programmed to attempt to re-establish homeostasis as long as V is in the range defined by the PLC as "charged." If the HTS fails to remain "charged," telemetry may be used to warn the operator that E(in) is not keeping up with E(out).

R include thermocouple sensors that keep track of ambient temperature and temperatures at each heat trace section, charge controllers that prevent the batteries from overcharging, and voltage transducers that keep track of E(in) and V. F include one or more relays, one for each heat trace section. When a receptor senses a stimulus, it sends information to the PLC, the PLC determines an appropriate response, and then sends a signal to the effectors. After receiving the signal, the relays open or close, thereby minimizing battery drainage. When there is insufficient E(in) to maintain homeostasis, the PLC keeps track of V and uses that information to control E(out) by rationing the amount of heat trace and length of time the heat traces run. This optimizes the use of battery power while energy from the generators recharge the battery bank with no lost production or down time. The PLC operates all functions through a set of dry contacts that will turn on and off the equipment as the need arises. This minimizes the energy needed for sensing receptor stimuli.

Figure 1:
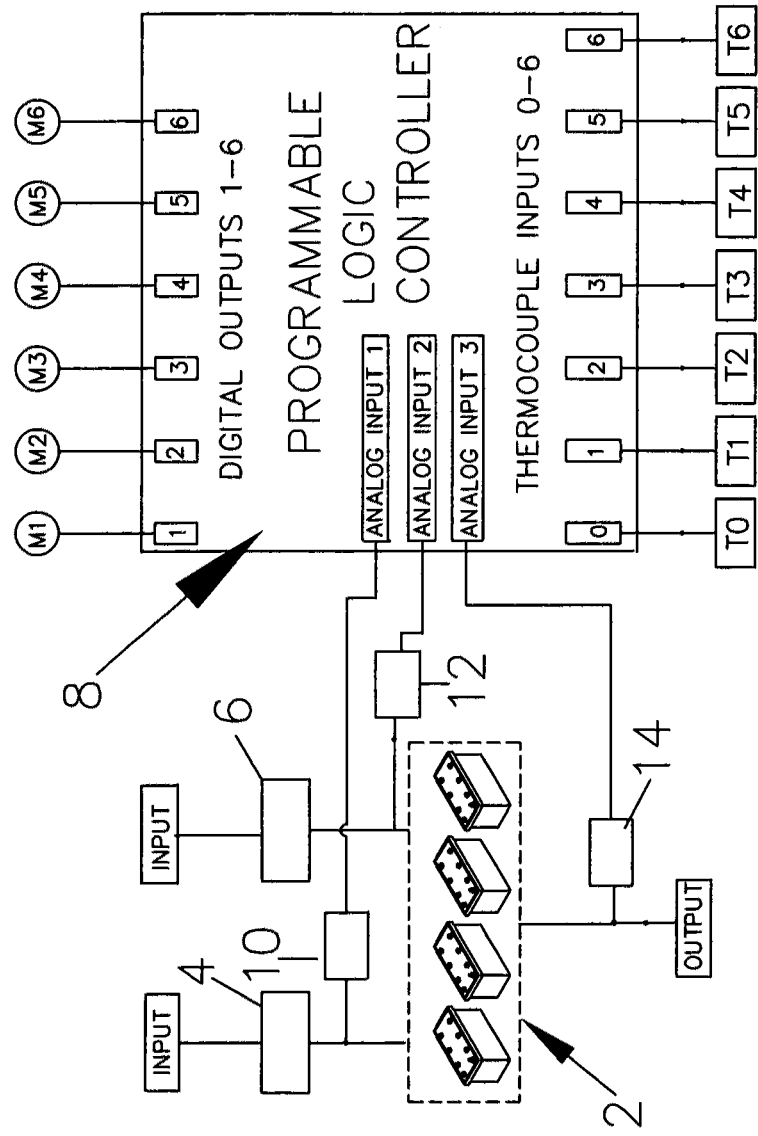
FIG. 1 . . . Homeostatic control system for maintaining battery charge.

FIG. 1 illustrates an embodiment of the invention's homeostatic control system that could be used in a heat trace system with six (6) heat trace sections. The energy storage system in FIG. 1 is battery bank 2. Charge controllers 4 and 6 limit E(in), thereby preventing the batteries in bank 2 from overcharging. Maximum Power Point Tracking (MPPT) or Pulse Width Modulation (PWM) charge controllers with or without meters may be used depending on the application. C is programmed in PLC 8, which may be a SIMATIC AUTOMATION DESIGNER S7-1200 model from SIEMENS.

R are voltage transducers 10, 12 and 14, ambient thermocouple T0, and heat trace thermocouples T1, T2, T3, T4, T5, and T6. F are relays M1, M2, M3, M4, M5 and M6. Voltage transducers 10, 12, and 14 monitor bank 2 input and output, and send that information to PLC 8 via SIEMENS 4-point analog input cards. Thermocouples T0, T1, T2, T3, T4, T5, and T6 monitor temperature changes and send information that may require an increase in E(in) to PLC via its thermocouple inputs. PLC 8 sends information to relays M1, M2, M3, M4, M5, and M6 via its digital outputs. If E(in) is sufficient to maintain homeostasis, relays M1, M2, M3, M4, M5, and M6 distribute power without rationing. If E(in) is insufficient to maintain homeostasis, relays M1, M2, M3, M4, M5, and M6 minimize deviations from homeostasis by rationing power to heat traces needing it. Eventually, either homeostasis is restored, or the system transmits a distress signal indicating that it may not be able to continue to prevent components from freezing.

Figure 2:
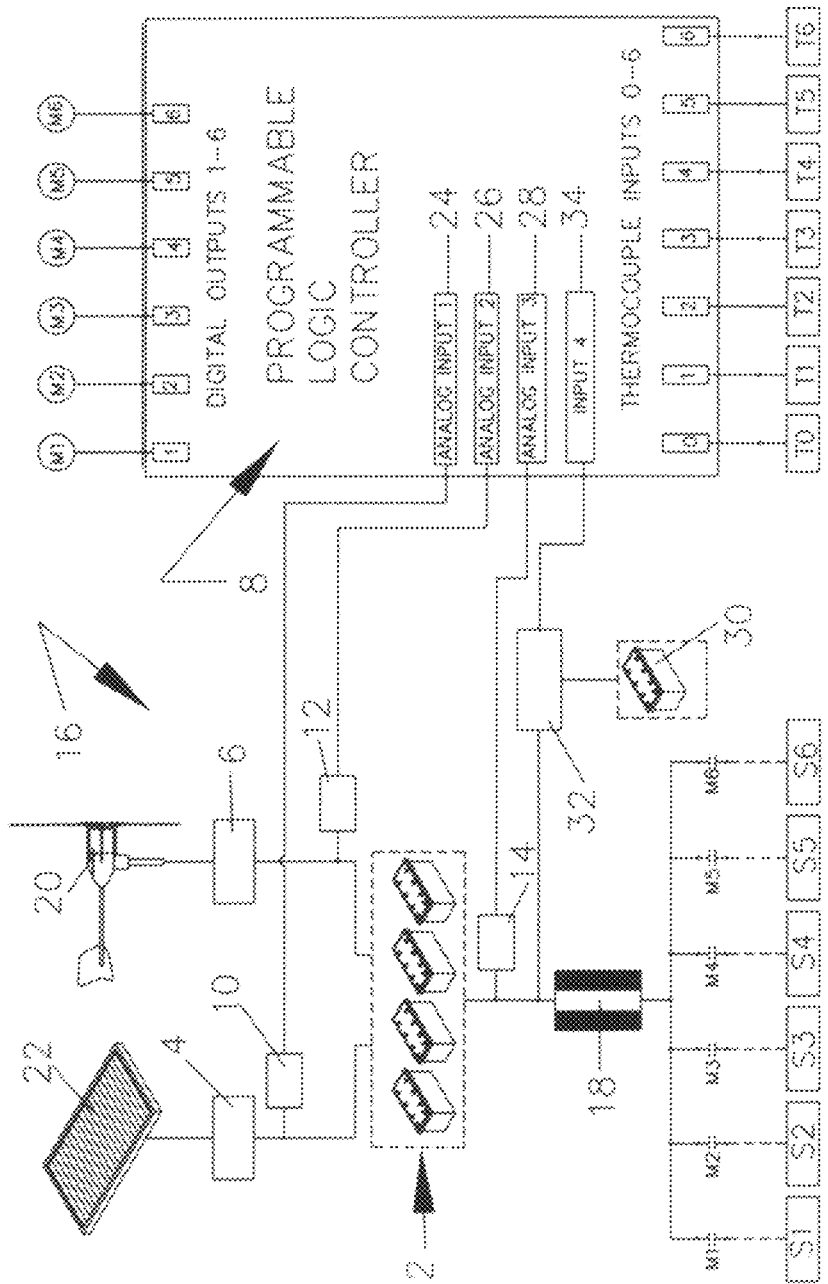
FIG. 2 . . . Line Diagram for HTS providing heat to six (6) heat trace sections.

FIG. 2 is a line diagram for HTS 16 with six heat trace sections, S1, S2, S3, S4, S5, and S6 using the homeostatic control system in FIG. 1. The heat trace sections are rated for use with 120 VAC with a specified watts/foot heat output, and are powered by alternating current from inverter 18. The DC input for inverter 18 is from battery bank 2, which is charged by aerogenerator 20 backed up by solar generator 22. Aerogenerator 20, which should have at least four blades, has AG charge controller 6 and AG voltage transducer 12, which supplies PLC 8 with wind turbine voltage data via a first PLC analog input 24; and solar generator 22 has SG charge controller 4 and SG voltage transducer 10, which supplies solar panel voltage data to PLC 8 via a second PLC analog input 26. If sufficient, E(in) from generators 20 and 22 keeps battery bank 2 fully charged while charge controllers 4 and 6 prevent overcharging. BB voltage transducer 14 supplies PLC 8 with information about V via a third PLC analog input 28. If V drops below its homeostatic range, PLC 8 activates effectors to ration power to various heat trace sections until homeostasis is re-established, after which all needed heat trace sections remain on if needed. Using inputs to PLC 8 from the receptors, the invention's novel control system (FIG. 1) can supply power to multiple combinations of heat trace sections.

HTS 16 in FIG. 2 is protected from power failure by an uninterruptible power source (UPS) comprising UPS backup battery 30 and DC UPS system 32, which provides PLC 8 with low voltage DC power via PLC control power input 34. UPS system 32 may include a static bypass switch for complete system shutdown. Thus, if sufficient wind and/or solar power is present, PLC 8 turns heat trace sections on and off as needed. However, if insufficient wind and sunlight are present, PLC 8 maximizes battery storage by tracking charge rate and battery voltage. If a heat trace needs heat but nothing is happening, a wireless telemetry call-out system (not shown) is activated. Similarly, if there are serious problems with maintaining battery storage, the UPS system provides temporary protection which may also trigger activation of the call-out system before freeze up occurs, thereby minimizing or preventing down time.

In a preferred embodiment of the invention for wells that freeze up only when the outside temperature drops below freezing, the ambient temperature is monitored using an outside thermostat. In the preferred embodiment for high pressure wells that may freeze up due to high pressure, the internal temperature of the line being traced is monitored using an in-line thermostat.

In embodiments requiring monitoring of ambient temperatures, ambient thermocouple sensor T0 provides PLC 8 with ambient temperature data via thermocouple input 0, and heat trace thermocouple sensors T1, T2, T3, T4, T5, and T6 provide PLC 8 with temperature data for heat trace sections S1, S2, S3, S4, S5, and S6, respectively via thermocouple inputs 1 through 6, respectively. Alternatively, T0 may be used to monitor internal line temperature in embodiments for high pressure wells. Digital out puts 1 through 6 from PLC 8 control relays M1, M2, M2, M4, M5, M6, respectively, thereby allocating power to heat trace sections S1, S2, S3, S4, S5, and S6, respectively, as needed.

In a preferred embodiment of HTS 16 in FIG. 2, solar generator 22 is capable of generating 135 watts, and aerogenerator 20 is capable of generating 1250 watts. Transducers 10 and 12 convert the output from each generator into an analog signal which may be input into PLC 8, and charge controllers 4 and 6 prevent overcharging of the batteries in bank 2. When power is needed by a heat trace section to prevent freezing, power stored in bank 2 is converted to alternating current by 600 watt DC-to-AC inverter 18 and consumed by the heat trace section.

The heat trace may use up to 5 watts per foot of AC power to protect equipment from freezing by heating 50 to 100 foot runs. In this embodiment, even when no wind power is being generated, the energy generated by solar panel 22 in full sunlight is sufficient to maintain homeostasis and prevent freezing of properly insulated equipment. With no wind power and insufficient solar power to maintain homeostasis, PLC 8 maximizes the use of battery reserve by rationing AC power to sections S1, S2, S3, S4, S5, and S6. With no power from either generator, PLC 8 allocates power from bank 2 and prevents freezing at any section for approximately 48 hours. An alarm is transmitted up to 24 hours before the system is unable to prevent freezing.

The 5 watt per foot heat trace described above applied over several sections is sufficient to prevent freezing at an oil and gas well under most circumstances provided the vulnerable well components are properly insulated and the trace is applied properly. For most wells, freeze prevention requires three to six sections totaling 50 to 100 feet. Obviously, if there is sufficient useable wind, an entire heat trace consuming 250 to 500 watts can be fully serviced by aerogenerator 20 providing 1,350 watts. However, if there is no wind power generated, a 135 watt solar panel cannot provide 250 watts (E(in)<E(out)). But, if the heat trace is broken up into five 10- to 20-foot sections (for example, S1, S2, S4, S5, and S6 in FIG. 2), each run requires only 50 to 100 watts. When PLC 8 rations power to each individual section, none alone exceeds the 135 watts available from solar generator 22 when full sunlight is present. Thus, even if each section required full power during equal allocation periods, by switching back and forth among all five sections, solar panel 22 can provide adequate power (and maintain homeostasis) when full sunlight is present. Proper insulation of each location reduces heat loss and therefore the power required to prevent freezing. For typical oil and gas wells, a 135 watt solar panel is sufficient to keep up with electrical demand temporarily even when E(in)<E(out) until aerogenerator 20 re-establishes homeostasis. In areas where more heat trace is needed, PLC 8 can be programmed to fit any application, and the HTS modified in a manner that is obvious to those skilled in the art. For example, another solar panel, charge controller, and transducer can be added (See FIGS. 4b and 5b).

The batteries in bank 2 may be 12 volt, 104 amp-hours at 24 hour rate. Six 104 amp-hour batteries pulling 125 watts provide 60 hours of battery life. Allotting 25 watts for power loss by inverter 18 and to power PLC 8 and measurement tools leaves about 48 hours of battery life for the heat traces. Battery 30 may be a 12 V, 26 amp-hours UPS battery, UPS system 32 may be a 12 volt YELLO PULS protection system, and the wireless telemetry call-out system (not shown) may be a SCADA system. In field tests, bank 2 re-establishes homeostasis within 48 hours provided aerogenerator 20 has at least four blades and is mounted on a tower of sufficient height that the blades are in clean air (See FIG. 7). For most applications, a tower at least thirty (30) feet tall is sufficient.

In another embodiment, which may be used in areas with less reliable wind power, solar panel 22 is capable of generating 200 watts, and aerogenerator 20 is capable of generating 2000 watts, battery bank 2 contains four 24 VDC batteries rated at 205 amp-hours at the 24 hour rate. FIG. 3 illustrates the backpan layout housed in electronic control enclosure 36 for this embodiment of HTS 16 in FIG. 2. The components in FIG. 3 are on a board approximately three feet square. From left to right, the top row includes MORNING STAR 30 amp, 24 VDC charge controller 4; YELLO PULS 24 VDC input/24 VDC output UPS system 32; SIEMENS 1401/1000 relay S7-1214C PLC 8; SIEMENS 87-1200 4-point analog input cards 24 and 26; SIEMENS S7-1200 4-point analog input card 28; SIEMENS S7-1200, CM1241, RS 48S corns module 34; two SIEMENS S7-1231 thermocouple inputs for T0, T1, T2, T3, T4, T5, and T6; and MORNING STAR 30 amp, 24 VAC charge controller 6. The middle row includes Exeltech 24 VDC/120 VAC 800 watt inverter 18; YELLO PULS 12 VDC, 26 Ah UPS system backup battery 30; and three (3) CR MAGNETICS 0-SOVDC, 4-20 Ma output 24 VDC power supplies 10,12 and 14. The bottom row includes relays M1, M2, M3, M4, M5, and M6 with their C-H 4-pot base relays; 4-pot 10 amp, 24 DVC interposing coil relays, 0-2 SOVDC relay coil protection diodes; their WEIDMÜLLER terminal blocks/end plates and end blocks 38; and seven (7) ALLEN-BRADLEY type 2 thermocouple terminal blocks 40 for T0, T1, T2, T3, T4, T5, and T6.

As in all embodiments of the present invention, when there is no wind power and insufficient solar power to maintain homeostasis; PLC 8 maximizes the use of battery reserve by rationing AC power. With no power from either generator, 34 amps for 24 hours provides sufficient power for at least three 10-foot heat trace sections requiring 5 watt/foot for thirty minutes/hour for at least four days without another source of power.

Without rationing, even a 200 watt solar panel cannot provide the heat trace with 500 watts if that is necessary to prevent freezing. But, if the heat trace is broken up into six 17-foot sections, each run requires only about 85 watts. When PLC 8 allocates power to each individual section, none alone exceed the power provided by a 200 watt solar generator when full sunlight is present. Thus, even if two sections required full power during equal allocation periods, by switching back and forth among pairs of all six sections, solar panel 22 can maintain homeostasis and provide adequate power for the entire heat trace when full sunlight is present.

As with all embodiments of the present invention, proper insulation of equipment protected by each heat trace section reduces heat loss and therefore the power required to prevent freezing. For typical oil and gas wells, a 200 watt solar panel keeps up with electrical demand until aerogenerator 20 re-establishes homeostasis. In areas where more trace is needed, PLC 8 can be programmed to fit any application. Moreover, HTS 16 can be modified in a manner that is obvious to those skilled in the art, for example, by adding another solar panel (FIGS. 4b and 5b).

Figure 4A:
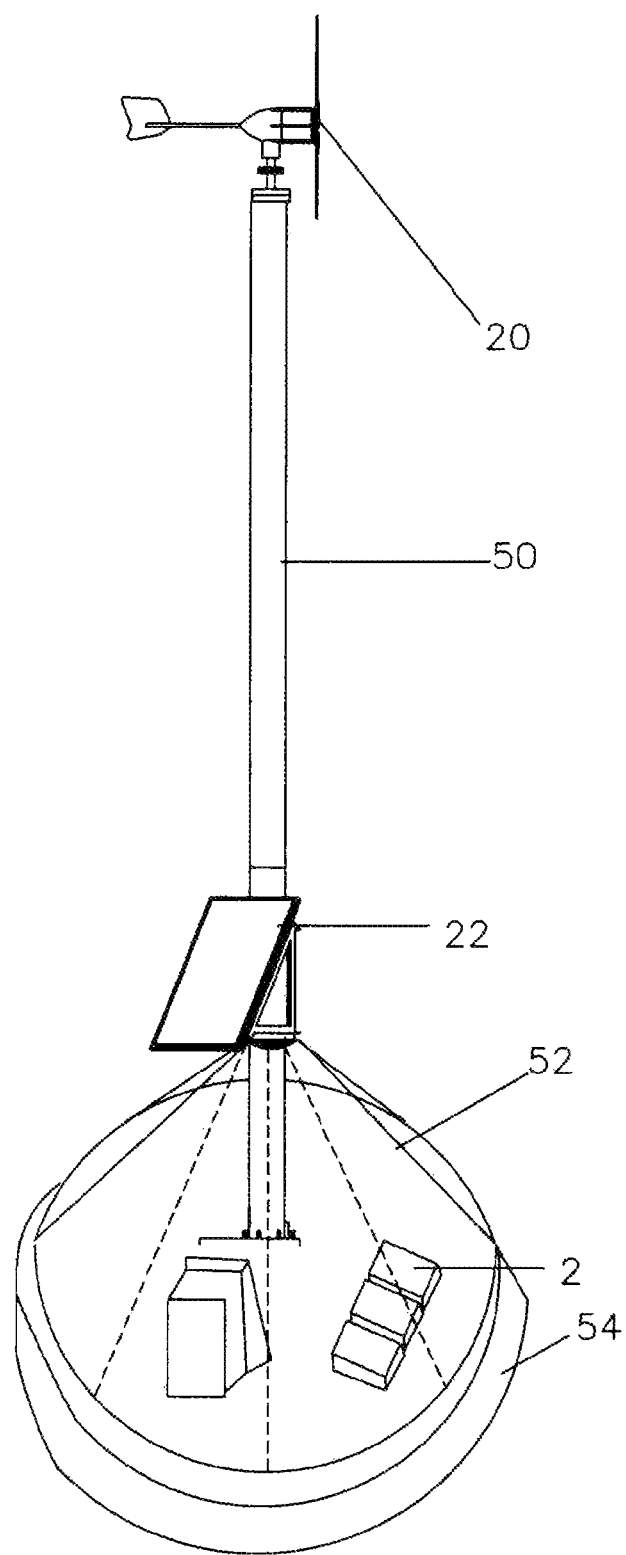
FIG. 4a . . . TeePee-style HTS with one solar panel used on an offshore platform.
Figure 4B:
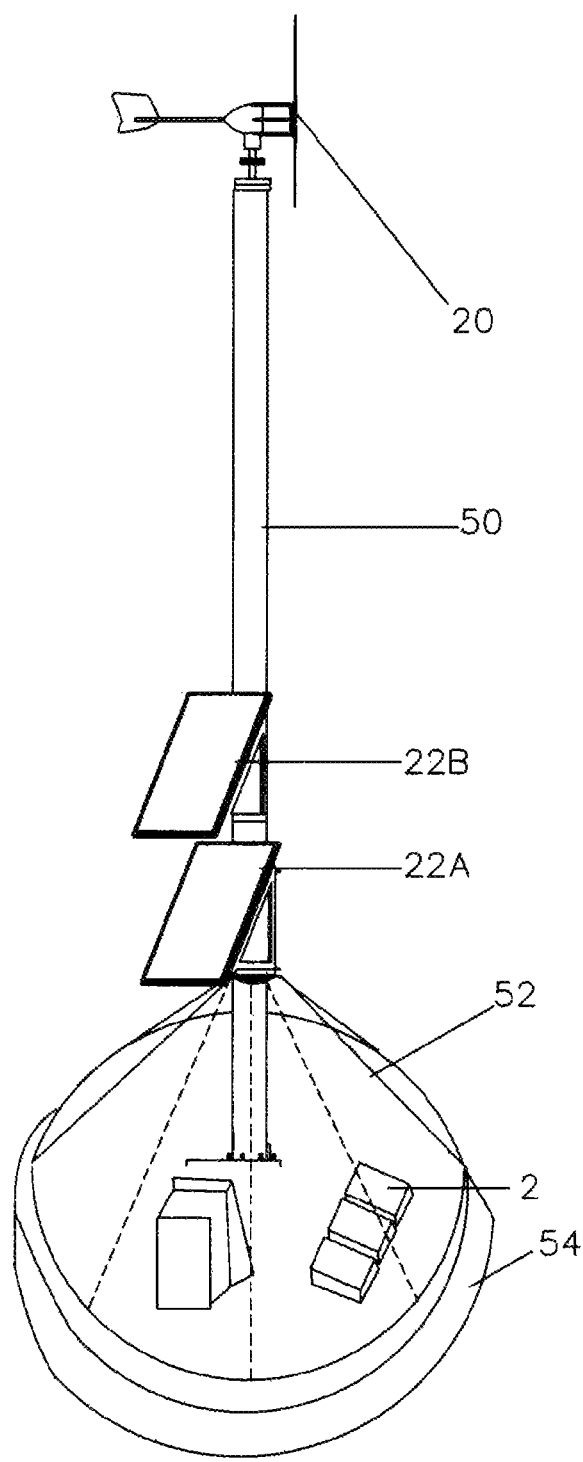
FIG. 4b . . . TeePee-style HTS with two solar panels.

The "teepee-style" embodiment of the invention is represented schematically in FIG. 4. In FIG. 4a, pole 50 is anchored into the top of tent-shaped enclosure 52, which contains the system's control components and battery bank 2, and the base of enclosure 52 is anchored into foundation 54. Five-bladed aerogenerator 20 is elevated approximately ten yards into clean air atop pole 50, and solar panel 22 is attached to pole 50 facing maximum sunlight. In FIG. 4b, second solar panel 22b is attached to pole 50 above first panel 22a. These "teepee" embodiments are especially suitable for preventing freeze up of vulnerable offshore well equipment in cold climates.

Figure 5A:
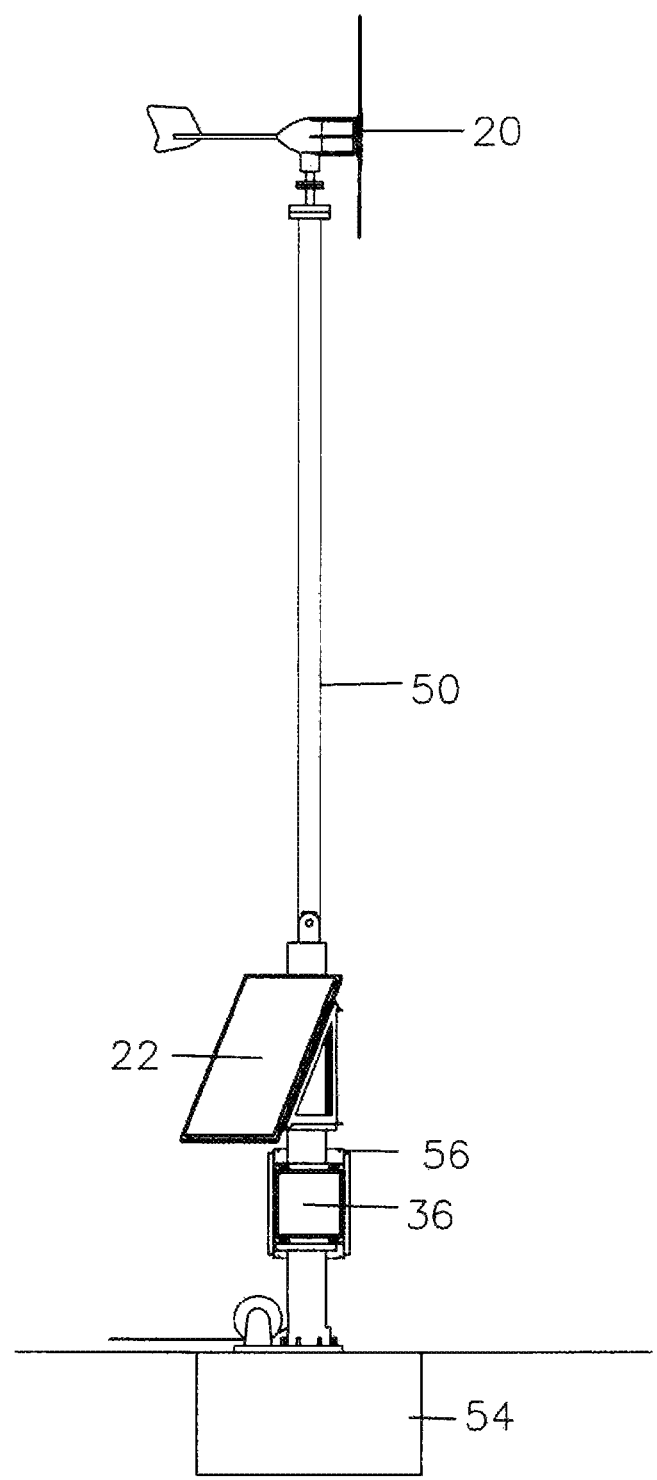
FIG. 5a . . . Pipe-style HTS with one solar panel.

The "pipe-style" embodiment of the invention is represented schematically in FIG. 5. In FIG. 5a, pipe 50 is anchored into foundation 54, and five-bladed aerogenerator 20 is elevated approximately ten yards into clean air on top of pipe 50. Solar panel 22 is attached to pipe 50 facing maximum sunlight. Control enclosure 36, which contains the system's control components, and battery enclosure 56 are attached to pipe 50 under solar panel 22. In FIG. 4b, second solar panel 22b is attached to pipe 50 above first panel 22a.

Figure 6:
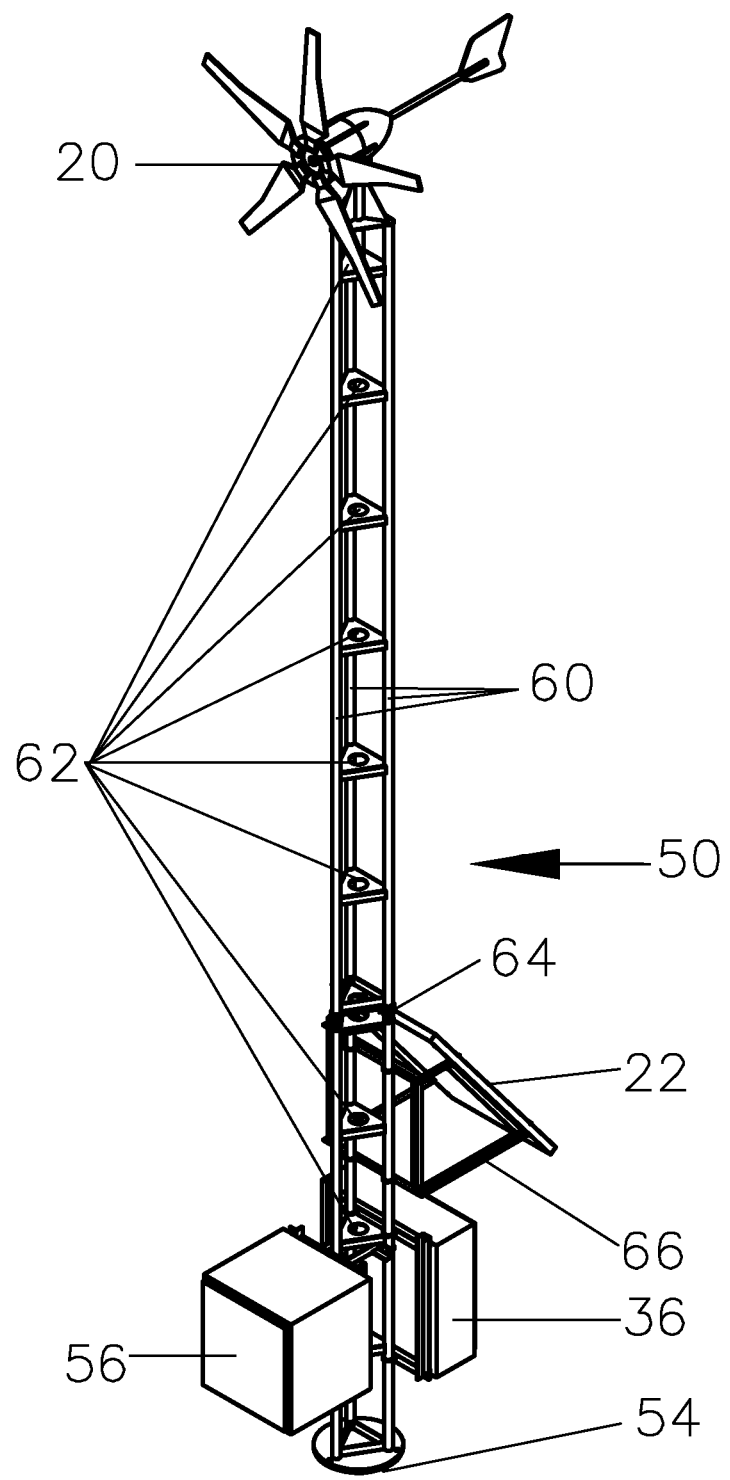
FIG. 6 . . . Perspective view of triangle-style hinged HTS

A perspective view of a "trianglar-style" embodiment of the invention is illustrated in FIG. 6. Tower 50 in FIG. 6 is comprised of three (3) 1.5" pipes 60, arranged vertically in a triangle with triangular support bars 62 for support as needed. Five-bladed aerogenerator 20 is elevated 357.875" into clean air on top of tower 50. Hinge 64 in tower 50 may be used to facilitate erection of tower 50 and access to aerogenerator 20. Solar panel 22 is attached to the back of tower 50 with its base support 66 attached to tower 50 73.75" above its base. Battery enclosure 56 is attached to the front of tower 50, centered 42.6875" above its base. Control enclosure 36, which contains the system's control components, is attached to the back of tower 50, and is also centered 42.6875" above its base.

Figure 7A:
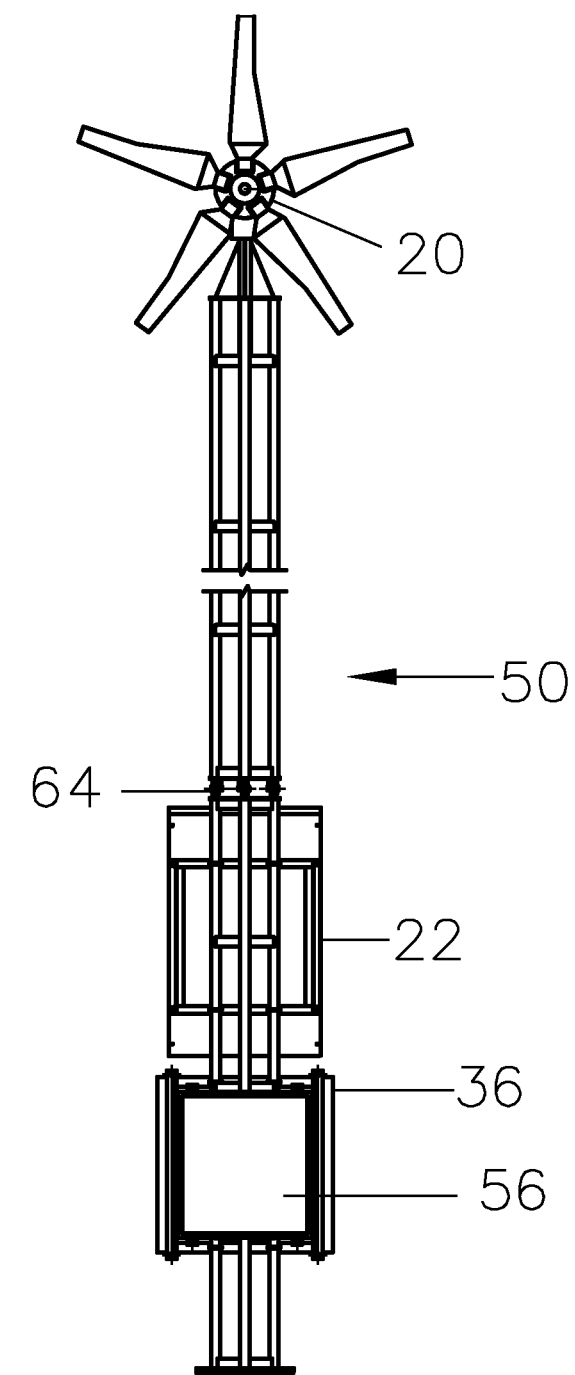
FIG. 7a . . . Front view of triangle-style hinged HTS.
Figure 7B:
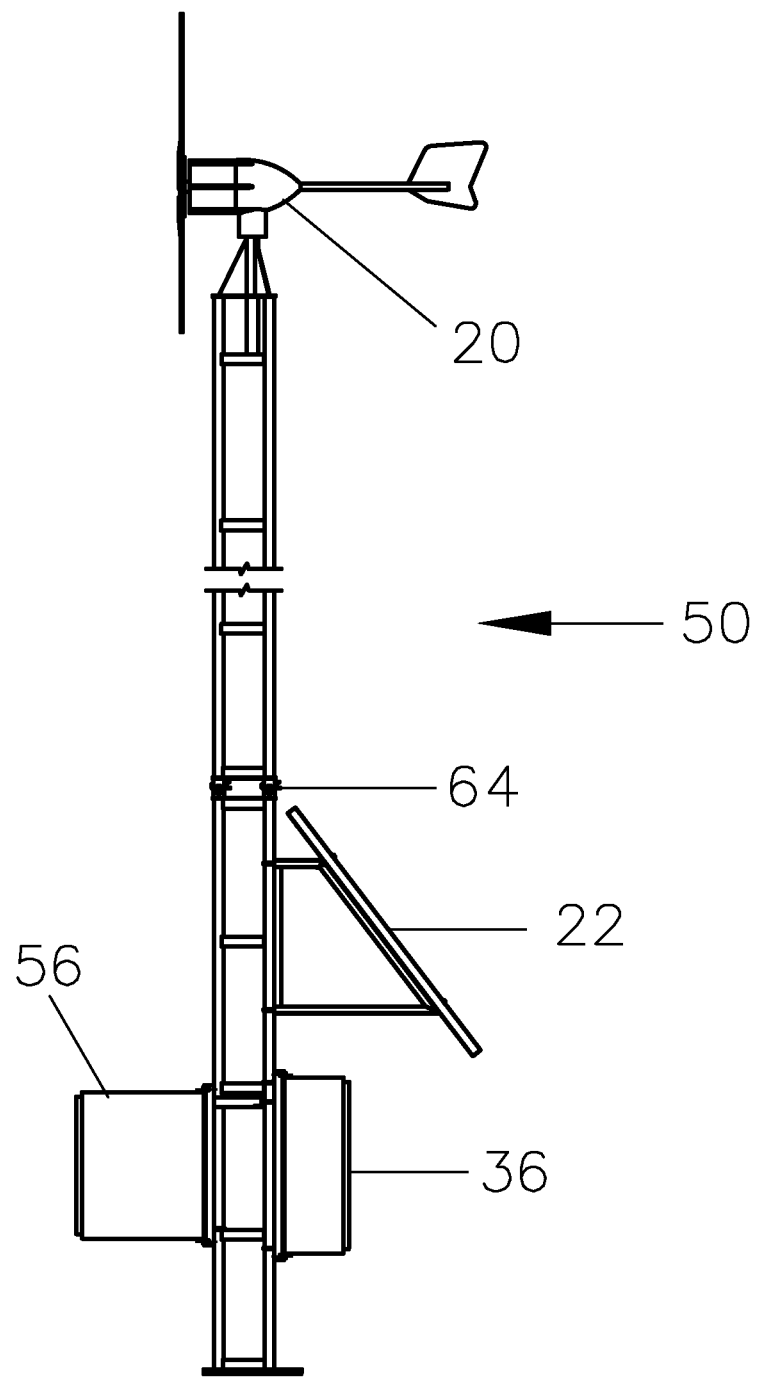
FIG. 7b . . . Side view of triangle-style hinged HTS.

A "hinged-style" embodiment of the invention in FIG. 7 is illustrated in FIG. 7a-7d. In these figures, hinge 64 in tower 50 is used to bend the upper portion of tower 50 down, thereby facilitating erection of tower 50 and access to aerogenerator 20. FIG. 7a is a front view wherein hinge 64 is slightly above the top of solar panel 22. FIG. 7b is a side view wherein the upper attachment for solar panel 22 is located slightly under hinge 64. FIG. 7c illustrates hinge 64 which may comprise a 0.125" wire hairpin and a 0.75" diameter clevis pin. FIG. 7d illustrates the attachment means for enclosures 36 and 56, which may be a first U-bolt 66 for attaching battery enclosure 56 to the front of tower 50 and a second and third U-bolt 68, 70 for attaching control enclosure 36 to the front of tower 50.

Figure 8B:
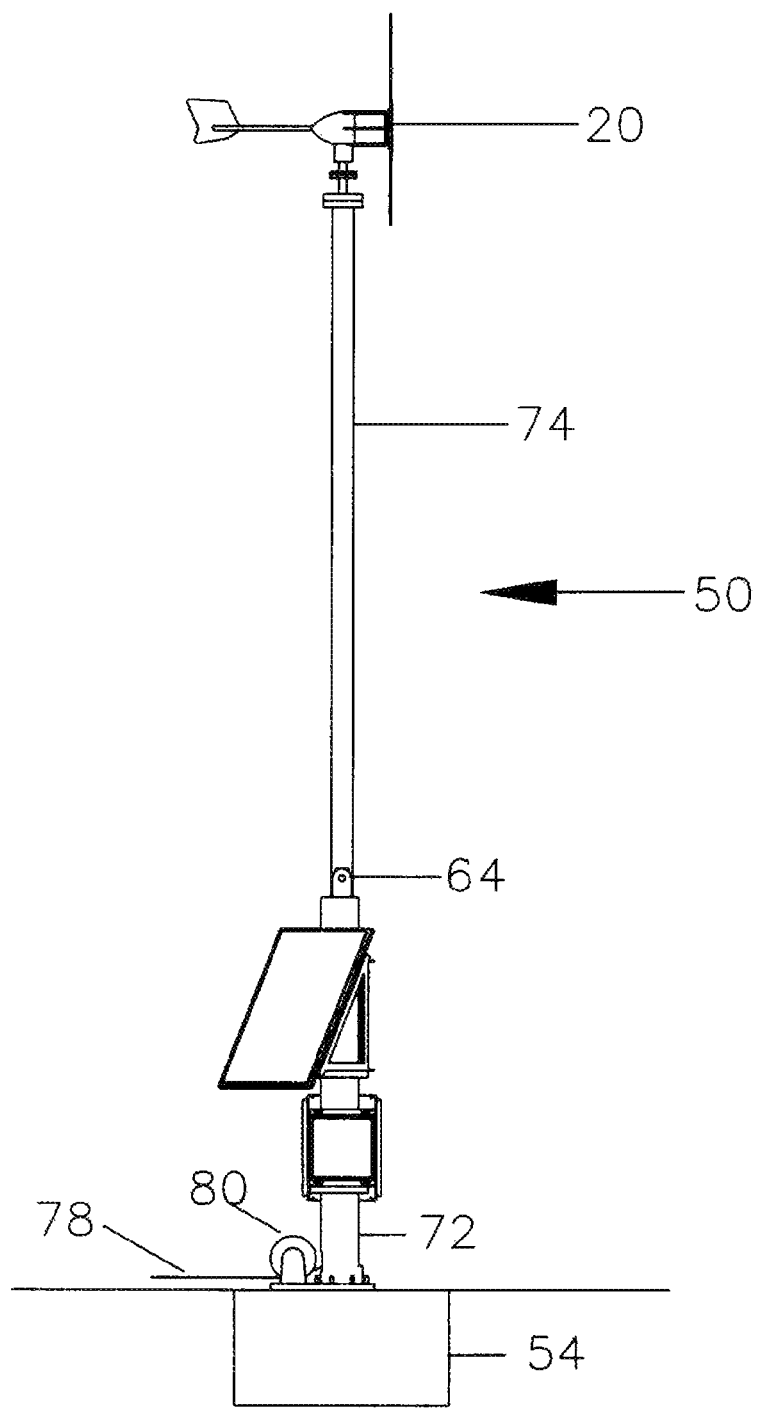
FIG. 8b . . . Hinged HTS in operating position.

FIG. 8 illustrates how the present invention can be erected in remote locations without using a crane and/or serviced without climbing pole 50. In FIG. 8a, HTS 16 is in its service position. Base pole 72, which may be approximately six to eight feet tall, is anchored into foundation 54. Pole 50, which may be at least thirty feet long for most applications, is divided into top section 74 and bottom section 76. The length of section 76 must be less than the height of base pole 72. Pole 50 is attached with hinge 64 to the top of base pole 72 where sections 74 and 76 merge. Aerogenerator 20 is attached atop pole 50, and cable 78 is attached to the bottom of pole 50 and extends from pole 50 under pulley 80 at the base of pole 72 and thence to a portable wench (not shown). When cable 78 is pulled horizontally as indicated by arrow 82, section 74 of pole 50 is pulled down as indicated by dotted arrow 84 until it is locked onto or inside base pole 72. Simultaneously, section 74 of pole 50 (and aerogenerator 20)

is pulled up as indicated by dotted arrow 86 until pole 50 is perpendicular to foundation 54 and the HTS is erected and ready for use as illustrated in FIG. 8*b*.

I claim:

1. A heat trace system comprising:
   at least one aerogenerator (AG) in electrical communication with a means for controlling AG charge,
   at least one solar panel (SG) in electrical communication with a means for controlling SG charge,
   said means for controlling AG charge in electrical communication with a means for storing charge and with a first means for transducing direct current (DC),
   said means for controlling SG charge in electrical communication with said means for storing charge and with a second means for transducing DC,
   an uninterruptible power source (UPS) backup system with a UPS battery in electrical communication with a means for protecting bank voltage,
   said means for storing charge in electrical communication with said means for protecting bank voltage, a third means for transducing DC and a means for converting DC into alternating current (AC),
   a plurality of heat trace sections, each associated with a means for changing current input and a means for sampling device temperatures,
   a means for sampling ambient temperature,
   an effector that includes all of said means for changing current input,
   a receptor that includes said means for sampling ambient temperature and all of said means for sampling device temperatures,
   a programmable logic controller (PLC) with three analog input cards, each in electrical communication with one of said first, second, or third means for transducing DC current, a low voltage DC input in electrical communication with said means for protecting bank voltage, a sufficient number of receptor inputs to provide input from said means for sampling ambient temperature and all of said means for sampling device temperatures, a sufficient number of digital effector outputs to provide input to all of said means for changing current input, and a means for controlling homeostasis.

2. The heat trace system of claim 1 wherein said means for controlling AG and SG charge are charge controllers, said means for transducing DC are volt-to-analog signal transducers, said means for storing current is a bank of one or more deep cell storage batteries, said means for converting DC into AC is a DC to AC inverter, said means for protecting bank voltage is an uninterruptible power source (UPS), said means for changing current input are rheostats and/or relays, said means for sampling ambient and device temperature are thermostats, and said means for controlling homeostasis comprises changing current input from said receptor to activate said effector, thereby opening or partially opening one or more of said means for changing current input for as long as said associated heat trace section requires heat when E(in) and E(out) are in the vicinity of homeostasis, and to ration said current to and through said means for changing current input to obtain optimal use of available energy when E(in) and E(out) are not in the vicinity of homeostasis.

3. The heat trace system of claim 2 wherein said heat trace sections are used to protect equipment at an oil and gas well from freezing and at least one of said thermostats for sampling ambient temperature is internal.

4. The heat trace system of claim 3 with one solar panel mounted on a thirty foot teepee-style pole.

5. The heat trace system of claim 3 with two solar panels mounted on a twenty foot teepee-style pole servicing an offshore oil and gas well.

6. The heat trace system of claim 3 with two solar panels mounted on a forty foot pipe-style pole.

7. The heat trace system of claim 3 with three solar panels mounted on a thirty-five foot triangular-style pole.

8. The heat trace system of claim 3 with one solar panel mounted on a thirty foot hinged-style pole.

9. The heat trace system of claim 3 with one aerogenerator and one solar panel wherein said aerogenerator is a 5-blade wind turbine capable of generating 1350 watts of power, said solar panel is capable of generating 200 watts of power, said bank contains six (6) 12 VDC 104 Ah batteries, said DC to AC inverter is a 600 watt DC/AC inverter, said heat trace sections are five twenty (20) foot sections of 5 watt/foot trace, and said DC to AC inverter and said programmable logic controller consume twenty-five watts of DC power.

10. The heat trace system of claim 9 wherein said bank is "charged" when the voltage of said batteries in said bank exceeds 11.4 volts.

11. The heat trace system of claim 3 with one aerogenerator and one solar panel wherein said aerogenerator is a 5-blade wind turbine capable of generating 2000 watts of power, said solar panel is capable of generating 200 watts of power, said bank contains four (4) 24 VDC 205 Ah batteries, said DC to AC inverter is a 600 watt DC/AC inverter, said heat trace is five twenty (20) foot sections of 5 watt/foot trace, and said DC to AC inverter and said programmable logic controller consume twenty-five watts of DC power.

12. The heat trace system of claim 11 wherein said bank is "charged" when the voltage of said batteries in said bank exceeds 22.8 volts.

13. The heat trace system of claim 3 wherein said charge controllers may be maximum power point tracking (MPPT) or pulse width modulation (PWM) charge controller with or without meters.

14. The heat trace system of claim 9 in homeostasis when the charge of said batteries in said bank is between 11.6 and 12.0 volts.

15. The heat trace system of claim 11 in homeostasis when the charge of said batteries in said bank is between 22.8 and 24.0 volts.

16. A control apparatus comprising:
    at least one means for transducing naturally occurring power into direct current (DC) in electrical communication with at least one means for controlling charge,
    each of said means for controlling charge in electrical communication with a means for storing current, and each in electrical communication with a means for transducing DC,
    at least one uninterruptible power source (UPS) backup system with a UPS battery in electrical communication with a means for protecting bank voltage,
    said means for storing charge in electrical communication with said means for protecting bank voltage, a third means for transducing DC and a means for converting DC into alternating current (AC),
    said means for converting DC into AC in electrical communication with a plurality of means for changing current input,
    a homeostatic control center with analog inputs in electrical communication with said means for transducing DC, digital effector outputs in electrical communication with an effector, receptor inputs in electrical communication with a receptor, and a means for controlling homeostasis, said receptor with means for sampling environmental parameters, and said effector with said plurality of means for changing current input.

17. The homeostatic control system of claim 16 wherein said means for transducing naturally occurring power into DC are solar panel(s) and/or aerogenerator(s), said means for storing charge is a bank of one or more deep cell storage batteries, said means for controlling charge are charge controller(s) with or without meters, said means for converting DC into AC is a DC to AC inverter, said means for protecting voltage is a UPS, said means for transducing DC are volt-to-analog transducers, said means for changing current input are rheostats and/or relays, said means for sampling environmental parameters are thermostats, and said means for controlling homeostasis comprises changing current input from said receptor to activate said effector, thereby opening or partially opening one or more of said rheostats and/or relays for as long as power is required when E(in) and E(out) are in the vicinity of homeostasis, and to ration said power to and through said rheostats and/or relays to obtain optimal use of available energy when E(in) and E(out) are not in the vicinity of homeostasis.

\* \* \* \* \*